United States Patent [19]

Goldfarb et al.

[11] 4,237,649
[45] Dec. 9, 1980

[54] TOY ANIMAL FIGURES REPRESENTING PARENT ANIMAL AND OFFSPRING

[75] Inventors: Adolph E. Goldfarb, 4614 Monarca Dr., Tarzana, Calif. 91356; Elonne Dantzer, Redondo Beach, Calif.

[73] Assignee: Adolph E. Goldfarb, Tarzana, Calif.

[21] Appl. No.: 8,957

[22] Filed: Feb. 2, 1979

[51] Int. Cl.³ .................. G09B 23/28; A63H 3/20; A63H 13/16; A63H 11/00
[52] U.S. Cl. ........................................ 46/161; 46/145; 46/153; 46/123; 35/17
[58] Field of Search .................... 35/17; 46/145, 153, 46/161, 123

[56] References Cited

U.S. PATENT DOCUMENTS

| | | | |
|---|---|---|---|
| D. 226,101 | 1/1973 | Marcus | 46/153 |
| 2,611,997 | 9/1952 | Solloway | 46/145 |
| 2,651,881 | 9/1953 | Glass | 46/145 |
| 2,678,505 | 5/1954 | Munson | 35/17 |
| 3,822,486 | 7/1974 | Knapp et al. | 35/17 |
| 3,952,449 | 4/1976 | Terzian | 46/161 |

Primary Examiner—Robert Peshock
Assistant Examiner—Michael J. Foycik, Jr.
Attorney, Agent, or Firm—Robert M. Ashen; Robert J. Schaap

[57] ABSTRACT

Toy mother and baby animal figures which simulate the giving of birth to the baby animal. The mother animal figure includes a hollow body having an interior chamber with an exit opening. An openable door is provided over the exit opening. The toy baby figure which is representative of an offspring of the mother animal is disposed within the chamber. The baby figure is capable of being collapsed, as by having multisection foldable legs which fold up against its body, so it will fit within the chamber. A conveyor mechanism is included within the mother animal figure and is manually actuable by the user to move the baby figure toward the exit opening while also opening the door so that the baby figure may be pushed out through the exit opening and thus be "born". After it is born, the baby figure may be expanded as by having its legs unfolded and it may be self-standing. The chamber may also be openable to permit replacing the baby figure.

34 Claims, 10 Drawing Figures

TOY ANIMAL FIGURES REPRESENTING PARENT ANIMAL AND OFFSPRING

BACKGROUND OF THE INVENTION

1. Field of the Invention

This invention relates in general to animal figures representing parent animal and their offspring, and more particularly, to a mother animal figure with means for simulating the delivery of an offspring animal figure.

2. Brief Description of the Prior Art

U.S. Pat. No. 2,611,997 to Soloway et al disclosed a toy figure representing an adult kangaroo and a smaller toy figure representing a baby kangaroo disposed in an opening representing the pouch of the adult kangaroo. An ejector mechanism was provided which forceably ejected the baby kangaroo so as to create an appearance of a baby kangaroo jumping out of the pouch of its mother.

A similar toy animal apparatus is illustrated and described in U.S. Pat. No. 2,651,881 to Glass, et al. In this patent there are also a toy figure which represents a mother kangaroo and which is capable of ejecting one or more objects, as for example objects representing baby kangaroos. Here again, the toy apparatus is designed to create an effect of a number of baby kangaroos jumping from their mother's pouch.

There has also been a commercially available toy animal figure in the form of a goat which is designed to simulate the eating of food objects. This goat is provided with a hollow animal body having an interior chamber and a conveyor means in the chamber which includes a continuous conveyor belt. The conveyor means is manually actuable by cranking a tail on the animal body for delivering the food objects which are introduced at a mouth on a head section of the animal figure to the interior of chamber of the animal figure. Further, an openable door on the side of the animal body could be manually opened by the user in order to remove the food objects from the interior chamber. This toy however, did not have any means for automatically delivering any object out of the body of the animal figure and the door had to be manually opened.

Applicants are not aware of any prior toy device which effectively represents a mother animal giving birth to an offspring, which not only is of significant play value, but is also highly educational for children.

OBJECTS OF THE INVENTION

It is, therefore, a primary object of the present invention to provide a toy animal apparatus in which an animal mother figure simulates the giving of birth to an offspring baby animal figure.

It is another object of the present invention to provide a toy animal apparatus of the type stated in which the mother animal figure includes a central chamber with a conveyor means in the central chamber and an access opening such that the baby animal figure can be moved through the body and out of the opening in the body of the mother animal figure.

It is a further object of the present invention to provide a toy animal apparatus of the type stated in which the baby animal figure is collapsible as by being provided with articulated limbs so as to be capable of fitting within a central chamber in the body of the mother animal figure.

It is also an object of the present invention to provide a toy animal apparatus of the type stated in which the mother animal figure includes a central chamber with a conveyor means in the central chamber and a movable door over an access opening such that the door can be moved to an open position in a time frame related to the moving of the baby animal figure through and out of the opening of the mother animal figure.

It is an additional object of the present invention to provide a toy animal apparatus of the type stated which has considerable play value and is also highly educational to children in the representation of a mother animal giving birth to an offspring baby animal.

It is another salient object of the present invention to provide a toy animal apparatus of the type stated which can be constructed so as to represent a number of different animals with each type of animal capable of giving birth to its own offspring.

It is yet another object of the present invention to provide a toy animal apparatus of the type stated which can be constructed at a relatively low cost but which is nevertheless relatively durable in its construction.

It is yet a further object of the present invention to provide a method of depicting birth by a mother toy animal figure discharging a baby toy animal figure.

With the above an other objects in view, our invention resides in the novel features of form, construction, arrangement, and combination of parts presently described and pointed out in the claims.

SUMMARY OF THE DISCLOSURE

A toy animal apparatus comprised of a toy animal figure representative of a mother animal and a toy animal figure representative of an offspring baby animal. The apparatus is designed to simulate the mother animal figure giving birth to the baby animal figure by passing the baby animal figure through an access opening in the mother animal figure.

The mother animal figure is generally comprised of a hollow body having an interior chamber with an access opening leading to the chamber. A conveyor means, which may adapt the form of a continuous conveyor belt, is located within the interior chamber and is positioned to carry the baby animal figure from the interior out through the access opening. A manually actuable means, as for example, a thumbwheel on the body of the mother animal figure, is operatively connected to the conveyor means to cause actuation of the same.

In one preferred embodiment, a door or closure panel is adapted to extend over the access opening and thereby hide the opening and the interior chamber from view. A door opening mechanism is also provided and is designed to shift the door or closure panel to the open position upon manual actuation of a member on the mother animal body. In the preferred embodiment, the same manually actuable mechanism which operates the conveyor means is also designed to operate the door opening mechanism. The baby animal figure may bear against the door as it is shifted to the open position and may merely slide on the conveyor belt as the latter is moving, at least until such time as the door has sufficiently opened so the baby animal figure can pass through the access opening. At this point, the conveyor means will cause the baby animal figure to shift outwardly through the access opening.

The door opening mechanism is designed so that a dwell time exists after the door has reached the fully open position. In this way, sufficient time is permitted for the baby animal figure to be fully ejected through the access opening and out of the body of the mother animal figure. Thereafter, the door may shift to the closed position automatically, as for example, it may fall by the force of gravity.

The conveyor mechanism is preferably inclined downwardly toward the rear portion of the mother animal figure and in addition, the access opening is preferably located at the lower rear portion of the mother animal figure. In this way, the arrangement more fully simulates the actual birth of an offspring baby from the mother animal.

The baby animal figure is foldable or collapsible so that it can fit within the interior chamber of the mother animal figure and lie on the conveyor means. Thus the baby animal figure may include a body along with a pivotally mounted head section and articulatable legs. In this way, the head can be shifted to a position where it is generally in alignment with the body and the legs can be shifted to a position where they essentially lie under or to the side of the body of the baby animal figure and thereby assume a collapsed position. When the baby has passed through the access opening it may be stood in an upright position by merely shifting the head to an upright position and by shifting the legs downwardly in order to support the baby animal figure in its standing position.

The baby animal figure may be manually reinserted in the interior chamber of the mother animal figure by manually opening an entrance to the chamber and placing the baby animal figure in the chamber on the conveyor means.

This invention possesses many other advantages, and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Having thus described the invention in general terms, reference will now be made to the accompanying drawings (four sheets) in which:

DETAILED DESCRIPTION OF A PREFERRED EMBODIMENT

Figure 1:
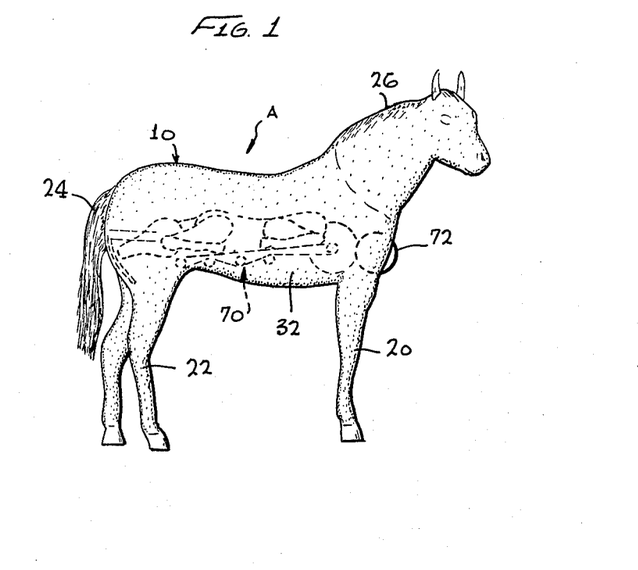
FIG. 1 is a side elevational view, partially shown in phantom lines and showing a mother toy animal figure apparatus of the present invention with a baby animal figure located within the interior chamber in the body of a mother toy animal figure.
Figure 2:
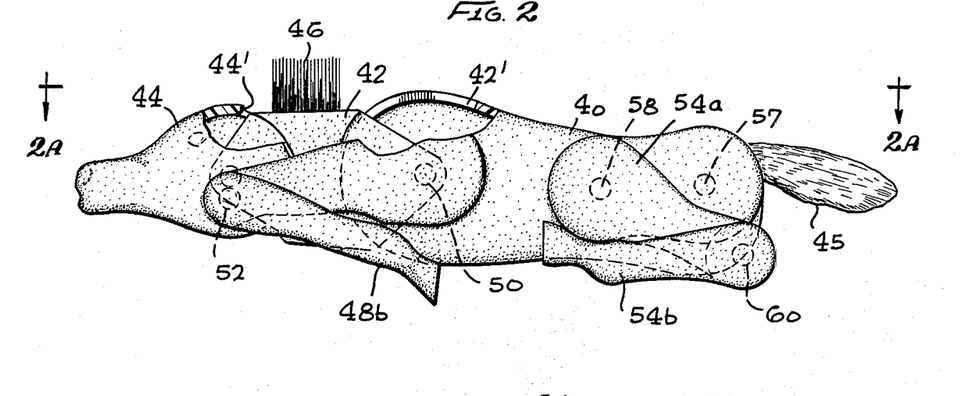
FIG. 2 is a side elevational view partially broken away and in section of the baby toy animal figure in a folded or collapsed condition so as to fit within an interior chamber in the body of the mother animal figure.
Figure 2A:
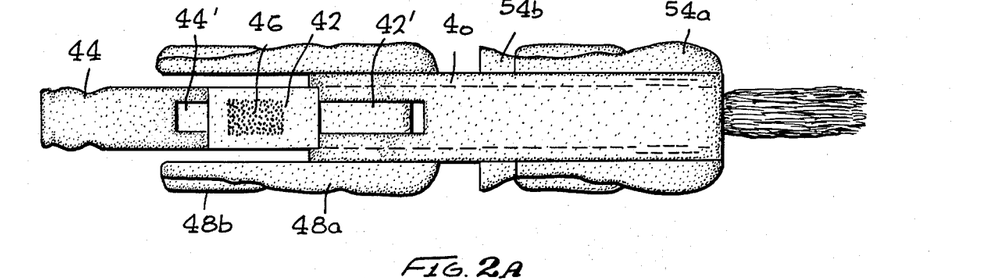
FIG. 2A is a top plan view of the baby animal figure in the collapsed condition as shown in FIG. 2 and taken substantially along line 2A—2A of FIG. 2.
Figure 3:
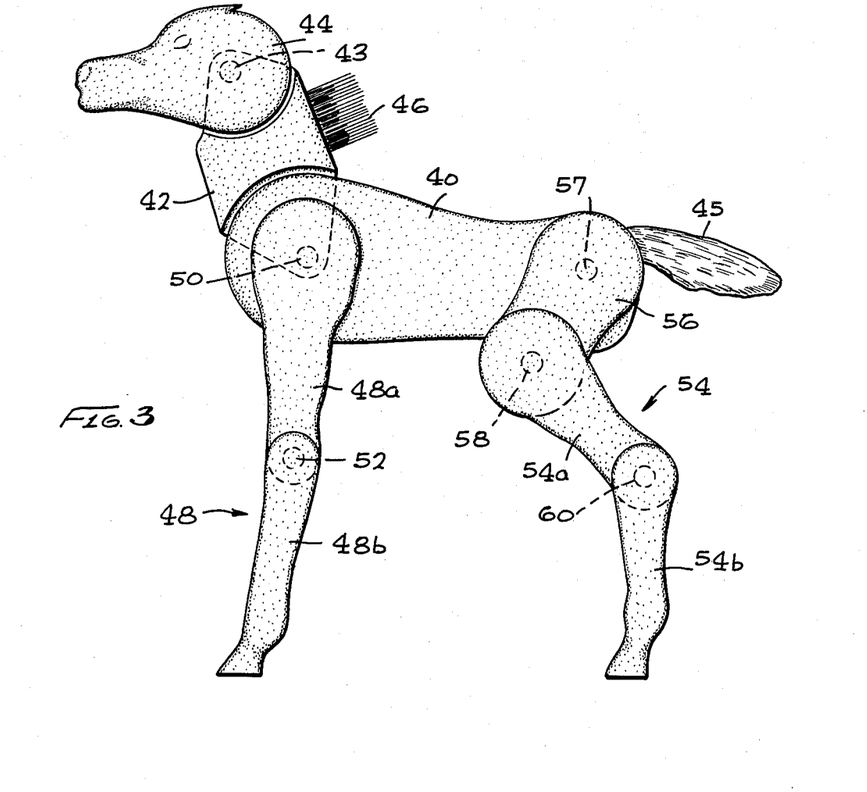
FIG. 3 is a side elevational view of the baby toy animal figure of FIGS. 2 and 2A, but in an open condition in which the baby animal figure is represented as standing in an upright position.

Referring now in more detail and by reference characters to the drawings which illustrate a preferred embodiment of the present invention, A designates a mother toy animal figure which is more fully illustrated in FIGS. 1 and 4-9 of the drawings and B designates a baby toy animal figure more fully illustrated in FIGS. 2, 2A and 3 of the drawings.

In the illustrated embodiment, the mother toy animal FIG. A is sized and shaped so as to simulate or characterized a female horse and the baby toy animal FIG. B is similarly sized and shaped so as to simulate or characterize a baby horse or so-called "foal". Nevertheless, it should be understood that the figures including both the mother figure and the baby figure could be sized and shaped to represent essentially any form of animal which gives birth to its offspring. Similarly, the mother toy animal figure could characterize various life forms which do not give birth to their offspring but which yield eggs which hatch to give rise to the offspring. For example, a segmented ostrich "egg" could be delivered, and the egg could then open to provide the baby ostrich. The term "animal" is used in a broad sense to include essentially any life form which gives rise to the birth of an offspring whether or not directly or through eggs or other birth mechanism. Thus, the term "animal" can include a variety of mammals, birds and the like.

Figures 5, 6, 7, 9:
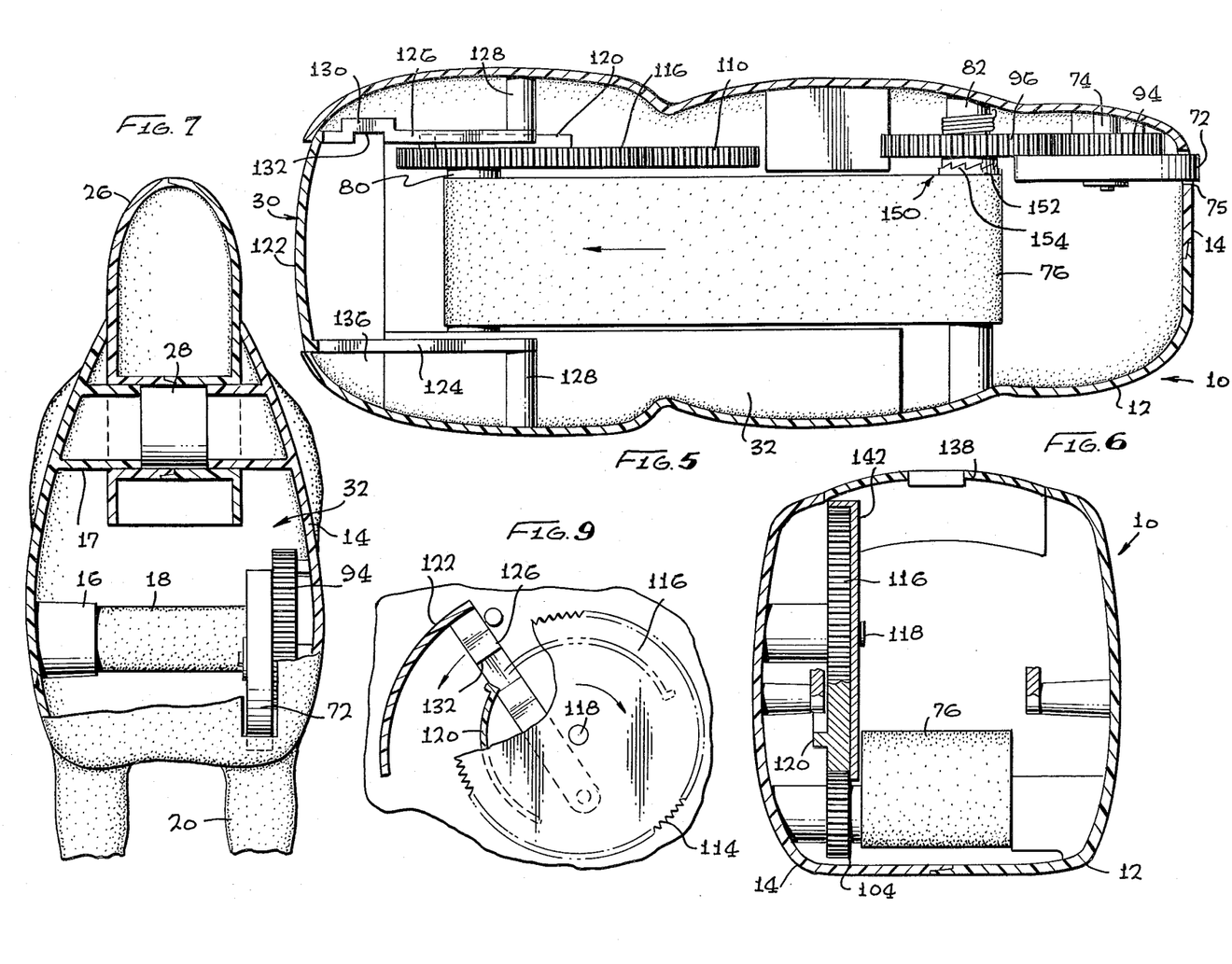
FIG. 5 is a horizontal sectional view taken essentially along line 5—5 of FIG. 4 and showing in more detail the conveyor means and door opening mechanism forming part of the mother toy animal figure.
FIG. 6 is a vertical sectional view taken along line 6—6 of FIG. 5 and showing in more detail a portion of the door opening mechanism forming part of the mother animal figure.
FIG. 7 is a vertical sectional view taken essentially along line 7—7 of FIG. 4 and illustrating a portion of the actuating mechanism to operate the conveyor means and door opening mechanism in the mother toy animal figure.
FIG. 9 is a fragmentary side elevational view, partially in section and showing a portion of the door opening mechanism of the present invention.

The mother animal figure generally comprises an outher housing 10 which is constructed of two longitudinal half shells 12 and 14 capable of being fitted together in the manner as illustrated in FIGS. 5 and 6 of the drawings. In this case, one of the half shells, such as the shell 12 is provided with a plurality of inwardly struck tubular posts 16, and which are sized to accommodate inwardly struck locking pins 18 formed on the other of the half shells as for example, the shell 14. Other means for attaching the two shell halves together may also be employed in accordance with the present invention as for example by screws, other fastners, adhesives, or the like. Further, internal reinforcing ribs 17 may be provided on each of the shells 12 and 14 and may be secured together.

Figure 4:
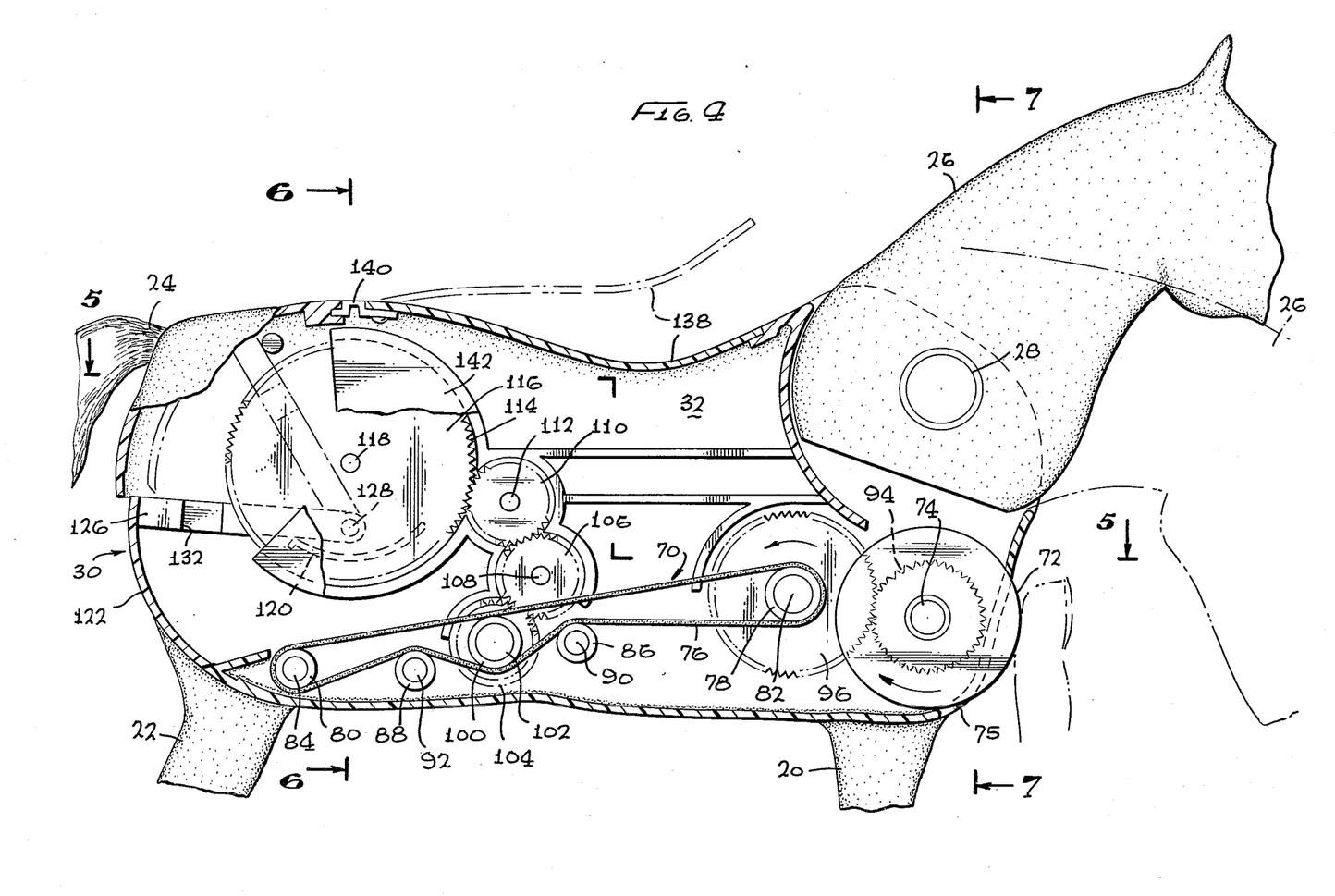
FIG. 4 is an enlarged side elevational view, partially broken away and in section, and showing an interior conveyor means and door opening mechanism for opening a door over an access opening in the mother animal body and for shifting the baby animal figure through the access opening in the body of mother animal figure.

The body 10 of the mother toy animal FIG. A is provided with front legs 20 and rear legs 22, and which may be integrally formed thereon, also in the manner as illustrated in FIGS. 1 and 4 of the drawings. Further, the mother toy animal FIG. A is provided with a tail 24 which may be attached to the body 10 in any conventional manner. The mother toy animal FIG. A is also provided with a head section 26 and which is pivotal on the forward end of the body 10 through a pivot mechanism 28. The head section 26 is capable of being shifted from an upper position as illustrated in the solid lines of FIG. 4 to a lower position as illustrated in the dotted lines of FIG. 4 or to any of a plurality of individual postions therebetween.

Figure 8:
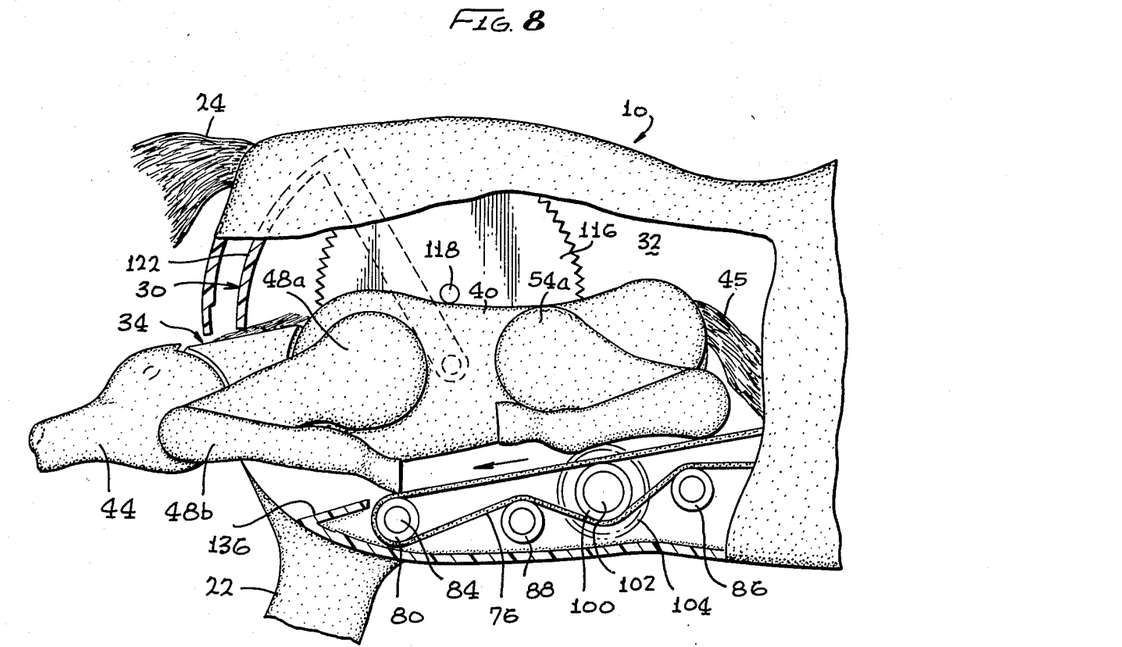
FIG. 8 is a fragmentary side elevational view, partially broken away and in section and similar to FIG. 4 and showing the door in the rear portion of the mother toy animal figure in the open position and the baby animal figure passing through the access opening.

The mother toy animal FIG. A includes a cover member or so-called "door" and often referred to as closure panel, at the lower rear portion of the animal body 10, and which is shiftable from a closed position as illustrated in FIG. 4 to an open position in the manner as illustrated in FIG. 8. The cover member 30, when shifted to the open position, permits access to an interior chamber 32 in the animal body through an access opening 34, and which access opening 34 is capable of having a baby toy animal figure pass therethrough when the latter is in the folded or collapsed condition. In this respect the outer surface of the cover member 30 is provided with an appearance so as to resemble an extension of the animal body.

The baby toy animal FIG. B or so-called "foal" is more fully illustrated in FIGS. 2, 2A and 3 of the drawings. The baby animal FIG. B also comprises an animal body 40 with a neck section 42 pivotally secured to the body 40 at the forward end thereof. Pivotally mounted on the neck section 42 at the upper and thereof, by means of a pivot pin 43, is a head section 44. The body 40 is similarly provided with a tail 45 which is fixedly mounted at the rearward thereof and a mane 46 on the neck section 42. The mane 46 is at least flexible or bendable so as to permit the foal B to pass through the access opening 34 in a manner to be hereinafter described in more detail.

The body 40 is also provided with a longitudinally extending groove 42 (as seen in FIGS. 2 and 2A) in order to accommodate the neck section 42 when the latter is shifted from the collapsed or folded condition as illustrated in FIG. 2A to the upright condition as illustrated in FIG. 3. In like manner, the head section 44 is also provided with a longitudinally extending groove 44 to permit the head section 44 to be pivoted about the neck section 42 when shifting the same from the collapsed condition as illustrated in FIGS. 2 and 2A to the unfolded condition as illustrated in FIG. 3.

Pivotally mounted at the forward end of the body 40 of the baby animal FIG. B are a pair of front legs 48 having upper leg sections 48a and lower leg sections 48b. The upper leg section 48a are connected to the body 40 by means of a pivot pin 50. The lower leg sections 48b are pivotally secured to the upper leg section 48a by means of pivot pins 52. It should be observed that the neck section 42 is pivotally secured to the body 40 by the same pivot pin 50 used to pivotally secure the upper leg section to the body 40, for simplicity and ease of construction. However it should be understood that these components could be separately pivotally secured to the body 40.

The rear portion of the animal body 40 is also provided with rear or so-called "hind" legs 54 which may include so-called hip joints 56 as illustrated. In this case the hip joints 56 are pivotally secured to the body 40 by means of a pivot pin 57 extending transversely through the animal body 40. The rear legs 54 are each comprised of upper leg sections 54a and lower leg sections 54b much in the same manner as the front legs. The upper leg sections 54a are pivotally secured to the hip joints 56 by means of pivot pins 58 and the lower leg sections 54b are pivotally secured to the upper leg sections 54a through pivot pins 60.

In accordance with the above outlined construction of the baby animal FIG. B, it can be observed that the various leg portions of the baby animal figure can be folded closely adjacent to the body 40 in the manner as illustrated in FIGS. 2 and 2A In addition, the neck section 42 can be pivoted to be somewhat in alignment with the body 40, and in like manner, the head section 44 can be pivoted to be essentially in alignment with the neck portion 42 and the body 40. In this way, the baby animal FIG. B can assume a relatively small compact position to be removably located within the central chamber 32 of the mother toy animal FIG. A.

When the rear legs 54 are folded adjacent to the body 40, it can be observed that the upper rear leg sections 54a bend so that the pivot pin 60 extends rearwardly and the lower rear leg sections 54b are bent forwardly about the pivot pins 60 such that the lower leg sections 54b lie almost under the upper rear leg sections 54a. Moreover, the forward legs 48 of the baby animal FIG. B are mounted approximately on the sides of the body 40 so that they can be folded to be in close fitting disposition to the sidewalls of the animal body 40, much in the same manner as the rear legs.

It can be observed that the legs of the baby animal figure are secured generally along the sides of the body 40. In this way, the legs can be folded generally along the sides of the body to assume a small compact condition. However, it should be understood that the legs could be pivotedly secured to the body generally anywhere on the body, as for example, under the body in a conventional fashion. Nevertheless, they should be foldable or collapsible so that the baby animal figure can assume a small compact condition so as to fit within the chamber of the mother animal figure.

The mother animal FIG. A is provided with a conveyor means 70 which is adapted to move the baby animal figure from the interior chamber 32 and through the access opening 34 when the cover member 30 is shifted to the upper position in the manner as illustrated in FIG. 8 of the drawings. The conveyor means 70 is operated and the rear cover member 30 is shiftable by means of a manually actuable mechanism, as for example, a thumbwheel 72 mounted at the forward end of the body 10. The thumbwheel 72 is mounted on a transversely extending shaft 74 journaled in the animal body and projects through a vertically disposed slot 75 formed at the forward end of the animal body 10. Thus, rotation of the thumbwheel 70 will cause the cover member 30 to shift to the open position and will cause the conveyor means 70 to push the baby animal figure outwardly through the access opening 34 in a manner to be hereinafter described in more detail.

The conveyor means 70 includes a continuous conveyor belt 76 which is trained about a roller 78 located near the forward end of the animal body 10 and another roller 80 located near the rearward end of the animal body 10. The roller 78 is mounted on a transversely extending roller shaft 82 and the roller 80 is similarly mounted on a transversely extending roller shaft 84. In addition, the movement of the conveyor belt 76 is at least guided partially by idler rollers 86 and 88 which are respectively mounted on idler roller shafts 90 and 92, in the manner as illustrated in FIG. 4 of the drawings. The various idler shafts 82, 84, 90 and 92 may be suitably journaled in the shells 12 and 14 of the body 10.

Also mounted on the transversely extending shaft 74 and being rotable therewith is a spur gear 94 which is rotated with the thumbwheel 72 and which is also disposed in meshing engagement with a similar gear 96 also mounted on the transversely extending shaft 82, and the latter of which also carries and drives the roller 78. In this way, it can be observed that if the thumbwheel 72 is rotated in a clockwise direction, reference being made to FIG. 4, then the gear 96 rotated therewith will be rotated in a clockwise direction, e.g. the direction of the arrow in FIG. 4, and hence the spur gear 96 and the conveyor belt 76 will be rotated in a counter-clockwise direction.

As the conveyor belt 76 rotates in a counter-clockwise direction, that is, with the upper portion of the belt 76 traveling to the left, (reference being made to FIGS. 4 and 8), it will simultaneously actuate a door opening mechanism operable to open the closure member or door 30. The door opening mechanism includes a pinion gear 100 disposed on a transversely extending shaft 102, which similarly carries a gear 104. The pinion gear 100 is engaged by and rotated pursuant to movement of the conveyor belt 76, and the gear 104 will be rotated with the gear 100.

The door opening mechanism in more fully illustrated in FIGS. 5, 7 and 9 of the drawings. The gear 104 meshes with an idler gear 106 mounted on a transversely extending shaft 108, and which, in turn, meshes with a gear 110 mounted on a shaft 112. Finally, the gear 110 meshes with a gear segment 114 on a wheel or disc 116, the latter also forming part of the rear door opening mechanism. The wheel 116 is mounted on a transversely extended shaft 118 which is secured to the half shell 14 of the body 10, as illustrated in FIGS. 4, 5 and 6 of the drawings. Further, the wheel 116 includes, on one of the flat faces thereof, an arcuately shaped outwardly extending protection 120 which functions as an abutment shoulder, in a manner to be hereinafter described in more detail.

The door or closure member 30 includes an outer panel 122 which extends over the access opening 34 and is secured to a pair of longitudinally extending, transversely spaced apart arms 124 and 126, more fully illustrated in FIG. 5. Each of the arms 124 and 126 are pivotally mounted on inwardly extending pivot pins 128 as also illustrated in FIG. 5 of the drawings. One of the arms 126 is provided with an offset portion 130 forming an inwardly presented arcuately shaped slot 132, for reasons which will presently more fully appear.

When the user of the apparatus rotates the thumbwheel 72, it will cause the conveyor belt 76 to rotate in a counter-clockwise direction, reference being made to FIG. 4, or to the left, reference being made to FIG. 5. As this occurs, the wheel 116 will rotate in the clockwise direction, reference again being made to FIG. 4. When the outwardly extending arcuately shaped shoulder 120 reaches the arm 126, it will engage the same and force the arm 126 as well as the arm 124 upwardly and carry therewith the closure panel 122. In this way, the door 30 is shifted to the upper or open position. It can be observed that the pivot pin 128 which supports the arm 126 is offset with respect to the point of rotation of the wheel 116, namely the shaft 118. Consequently, as the wheel 116 rotates, the shoulder 116 will move into the arcuately shaped slot 132 formed in the arm 126. As this occurs, the shoulder 120 will initially bear against an edge 134 partially defining the slot 132 thereby creating a dwell time in which the door remains in the open position. This dwell time allows a sufficient time interval for the foal B to pass through the access opening 34.

The continued rotation of the wheel 116 will cause the shoulder 120 to move through and beyond the arcuately shaped slot 132 and in this way, the force of gravity will permit the door to fall back to its initial or closed position, as illustrated in FIG. 4 of the drawings.

When the door 30 has been shifted to the open position, the continuous rotation of the conveyor belt 76 will cause the foal B to be urged outwardly of the chamber 32. Moreover, it can be observed by reference to FIG. 8 that the entire conveyor mechanism 70 is inclined downwardly toward the rear portion of the mother animal FIG. A. Moreover, a shelf 136 is integrally formed with the body 10 adjacent to the access opening 34 so as to guide the foul B as it exits the chamber 32.

It should also be observed in the embodiment as illustrated that the foal B is located on the conveyor belt 76 almost immediately adjacent the door 30. This is due to the size and configuration of the foal in the illustrated embodiment. However, it should be understood that the foal B could be constructed of a smaller overall dimension and with a slightly different configuration so that it could be located at the forward end of the mother animal figure in the chamber 32. Nevertheless, as indicated above, the foal will effectively slide along the conveyor belt 76 as the latter is rotated until the door 30 has reached a position where the foal can pass outwardly and the simulate the condition of being born from the mother.

The foal may be reinserted into the interior chamber 32 by means of an opening in the upper portion of the animal body 10 and which is initially covered by a panel 138 in the manner as illustrated in FIG. 4. In this way, the user can merely open the panel 138 and shift the same to the position designated by the phantom lines illustrated in FIG. 4 in order to thereby reinsert the foal B back into the conveyor belt 70. Thereafter, the user would merely shift the panel 138 back to the closed position as illustrated in the solid lines of FIG. 4. However, it should be understood that the user could reinsert the foal B back into the chamber 32 and locate the same on the conveyor belt 76 through the access opening 34. It should also be understood that the panel 138 could be completely removable if desired in order to reinsert the foal back into the chamber 32. In the illustrated embodiment, however, the panel 138 is hingedly connected to the body 10 by means of a conventional hinged attachment 140, as illustrated. In addition, an arcuately shaped cover plate 142 is disposed over a portion of the wheel 116 and the associated gears as for example, the gears 110 and 106 and 100, also as in the manner illustrated in FIG. 4. In this way, the foal will not interfere with the operation of the door opening mechanism.

The conveyor means and door opening mechanism as previously described are operable only in one direction. In other words, the conveyor belt 76 can only rotate in the counter-clockwise direction (FIG. 4). Further, the door opening mechanism will only operate when the wheel 116 is rotated in the clockwise direction (FIG. 4). For this purpose, a clutch mechanism 150 of the type illustrated in FIG. 5 of the drawings is provided. The clutch mechanism 150 is mounted on or operatively interposed in the shaft 82 which carries the roller 78 and the latter of which causes rotation of the conveyor belt 76 as aforesaid. The clutch 150 is relatively simple in that it comprises a clutch plate 152 on the shaft 82 having a plurality of teeth 154 disposed in meshing engagement with an opposed face or plate on the shaft 82. The teeth 154 are designed to engage when rotated in only one direction and thus permit rotation only in one direction. Thus, if the user of the apparatus attempts to rotate the thumbwheel 72 in a counter clockwise direction, reference being made to FIGS. 1 and 4, then the clutch 150 will merely slip and no further action will take place.

The animal bodies, and including the legs and head portions as well as the manes and tails and the operating mechanisms in the mother animal figure could be formed of any of a number of known plastic materials, as for example polyethylene, polystyrene, many of the vinyl polymers and copolymers, and the like. In addition, these components could be formed as a unitary structure, or, otherwise formed as individual components which are secured together by means of adhesives or other conventional fastening means. In addition, the animal body as well as the other aforementioned components e.g. the components forming part of the conveyor means and the like, could be formed of such plastic materials or other plastics in a number of known molding operations, as for example, blow-molding, injection molding, thermo forming, or the like. These various components may also be formed of other materials, such as various metals, or various known reinforced plastic materials, as for example, fiberglass-epoxy resin composites, or the like.

In the operation of the apparatus as illustrated, the user will initially fold or collapse the foal B by bending the legs to assume the position as illustrated in FIGS. 2 and 2A of the drawings. Thereafter, the neck section 42 and the head section 44 will be pushed downwardly to assume an approximate horizontal alignment with the body 40. In this condition, the foal is relatively compact and can be inserted into the chamber 32 of the mother animal figure A.

The user of the apparatus can easily insert the foal B by opening the panel 138 and merely inserting the foal into the chamber 32 and disposing the same on the conveyor belt 70. In this respect, the foal is positioned so that the head is pointed rearwardly. Alternately, the user can insert the foal through the access opening by mere physically lifting up on the door 30, in the manner as previously described.

In order to create the condition in which the foal is effectively being "born", the user can turn the thumbwheel 72, in a clockwise direction, reference being made to FIG. 4. As this occurs, the conveyor belt 70 will start rotating in a counterclockwise direction. Moreover, the wheel 116 will rotate in the clockwise direction and cause the door to open in the manner as previously described. As this occurs, the foal will be pushed outwardly thereby representing a condition of birth.

Thus this toy animal figure apparatus is highly effective and demonstrating the principles of a baby animal being born from the body of its mother.

It can be observed that one mechanism essentially causes the simultaneous opening of the door 30 along with the movement of the conveyor belt 30. This is highly desirable in that it simplifies construction, reduces the number of parts and hence cost and also reduces the number of possible problems. However, it should be understood that two individual mechanisms could be employed. Thus, one mechanism which is manually actuable could be employed for moving the conveyor means and hence the foal toward the access opening 34, and another mechanism which is manually actuable could be employed for shifting the door 30 to the open position.

As indicated previously, the conveyor means comprises a continuous conveyor belt trained around a plurality of pulleys. In this same respect, it should be understood that the conveyor belt could adopt the form of a timing belt, if desired along with sprockets in place of the rollers. Moreover, it is possible to use a plurality of conveyor belts which might be desirable depending upon the actual configuration of the animal body. In addition to the foregoing, it is also possible to use other forms of conveyor means which include for example a rack and pinion gears. Thus, a pinion gear could be rotated so that a rack is shiftable back and forth in the animal body and carries the foal to the access opening. Thus, the term "conveyor means" is used in a broad sense to include a member which is movable to cause the foal to be pushed out of the access opening in the animal body.

As also indicated previously, the toy apparatus of the invention is operable by manual actuation of a thumbwheel. In the same respect, it should be observed that the actuation could be created by similar mechanisms, as for example, by a rockable member on the animal body. For example, one of the legs of the animal could be pivotally secured to the animal and connected to the conveyor means to cause movement of the same. It is also possible to use a small motive means for example, a simple electrical motor to operate the conveyor means if desired, although the manual actuation is preferred due to the simplicity of construction and cost factors involved.

It should also be understood that the head section, particularly of the mother animal figure, could be operatively connected to the conveyor means to cause movement of the same during the operation of the conveyor means. Other accesories may also be provided with the toy animal figure apparatus and include for example, sound generating mechanisms and the like which are conventional in construction.

Thus, there has been illustrated and described a unique and novel toy animal figure representative of a mother animal capable of having a toy animal figure representative of an offspring baby animal removable therefrom simulating the giving of birth to offspring, and which, therefore fulfills all of the objects and advantages sought therefor. It should be understood that many changes, modifications, variations and other uses and applications will become apparent to those skilled in the art after considering the specification and the accompanying drawings. Therefore, any and all such changes, modifications, variations and other uses and applications which do not depart from the spirit and scope of the invention are deemed to be covered by the invention which is limited only by the following claims.

Having thus described our invention, what we desire to claim and secure by U.S. Letters Patent is:

1. A toy animal apparatus comprising;
    (a) a first toy animal figure representative of a mother animal, said mother animal figure being comprised of:

11

(1) a body having an interior chamber and an access leading to said chamber,
(2) conveyor means in said chamber, and
(3) manually actuable means on said body and being operatively connected to said conveyor means for causing movement of said conveyor means when actuated, (b) a second toy animal figure representing a baby offspring of said mother animal, said baby animal figure having a size smaller than that of said chamber in the body of the mother animal, said baby animal figure being positionable within said chamber and on said conveyor means so that said baby animal figure will be moved out through the access opening representing birth of the baby animal upon actuation of said manually actuable means said conveyor means comprising a continuous conveyor belt.

2. The toy animal apparatus of claim 1 further characterized in that said baby animal figure is at least partially collapsible and has a size larger than said chamber in at least one dimension when in the collapsed condition.

3. The toy animal apparatus of claim 2 further characterized in that said baby animal figure is comprised of a plurality of legs pivotly secured to said body of said baby animal and said legs pivot to be folded under the body of said baby animal figure when in said chamber.

4. The toy animal apparatus of claim 3 further characterized in that said baby animal figure is provided with a head pivotly secured to the body of said baby animal figure and said head is pivotal to a position in general alignment with the body of said baby animal figure when in said chamber.

5. The toy animal apparatus of claim 1 further characterized in that a closure member extends over said access opening and is openable to permit said baby animal figure to be removed from said chamber.

6. The toy animal apparatus of claim 5 further characterized in that said closure member is operable by actuation of said manually actuable means.

7. The toy animal apparatus of claim 5 further characterized in that said closure member is operable by actuation of said manually actuable means with the movement of the baby animal figure on said conveyor means to said access opening.

8. The toy animal apparatus of claim 1 further characterized in that said mother animal figure is a horse and said baby animal figure is a foal.

9. The toy animal apparatus of claim 1 further characterized in that said conveyor means is also operable with a clutch means such that said manually actuable means will only drive said conveyor belt in one direction.

10. The toy animal apparatus of claim 9 further characterized in that said access opening is located at the rear portion of the body of said mother animal figure.

11. A toy animal apparatus comprising a first toy animal figure representative of a mother animal figure and said mother animal figure being comprised of:

(a) a body having an interior chamber and an access opening leading to said chamber, and said chamber having a size to receive a second toy animal figure representing a baby offspring of said mother animal figure,
(b) conveyor means in said chamber for supporting and moving said baby animal figure outwardly from said chamber through said access opening,
(c) closure means over said access opening to hide said chamber from view and being shiftable to permit said baby animal to pass through said access opening,
(d) first actuable means associated with said body and being operatively connected to said conveyor means for causing movement of said conveyor means when actuated, and
(e) second actuable means associated with said body and being operatively connected to said closure means for causing movement of said closure means when actuated, such that the baby animal figure will be moved out through the access opening representing birth of the baby animal figure upon actuation of said first and second actuable means, said conveyor means comprising a continuous conveyor belt.

12. The toy animal apparatus of claim 11 further characterized in that said first and second actuable means are on said body and are manually actuable.

13. The toy animal apparatus of claim 11 further characterized in that said first and second actuable means are on said body, a manually engageable member on said body being operatively connected to said first and second actuable means to cause actuation of both said conveyor means and said closure means upon actuation of said manually engageable member.

14. The toy animal apparatus of claim 11 further characterized in that said apparatus comprises a baby animal figure having a body with a size substantially smaller than that of the mother animal figure.

15. The toy animal apparatus of claim 14 further characterized in that said baby animal figure is at least partially collapsible and has a size larger than said chamber in at least one dimension when in the collapsed condition.

16. The toy animal apparatus of claim 15 further characterized in that said baby animal figure is comprised of a plurality of legs pivotly secured to said body of said baby animal and said legs pivot to be folded under the body of said baby animal figure when in said chamber.

17. The toy animal apparatus of claim 16 further characterized in that said baby animal figure is provided with a head pivotly secured to the body of said baby animal figure and said head is pivotal to a position in general alignment with the body of said animal figure when in said chamber.

18. The toy animal apparatus of claim 17 further characterized in that said mother animal figure is a horse and said baby animal figure is a foal.

19. A toy animal apparatus comprising:
(a) a first toy animal figure representative of a mother animal, said mother animal being comprised of:
(1) a body having an interior chamber and an access opening leading into said chamber,
(2) movable means in said chamber, and
(3) actuable means associated with said body and being operatively connected to said movable means for causing movement of said movable means when actuated,
(b) a second toy animal figure representing a baby offspring of mother animal figure, said baby animal figure being comprised of:
(1) a body having a size smaller than that of said chamber in the body of the mother animal figure,
(2) at least one limb pivotally connected to the body of said baby animal figure and being shiftable to lie adjacent to the body of said baby animal figure so as to fit within said chamber and so that said baby animal figure will be moved out through the access opening representing birth of the baby animal upon actuation of said actuable means, said limb also being shiftable to a position where it extends outwardly from the body of said baby animal figure such that the baby animal figure has a size larger than said access opening in at least one dimension when such limb is extended, said movable means comprising a continuous conveyor belt and said actuable means being on said body of said mother animal figure and being manually actuable.

20. The toy animal apparatus of claim 19 further characterized in that said baby animal figure is comprised of a plurality of limbs representing legs pivotally secured to said body of said baby animal and said legs pivot to be folded adjacent the body of said baby animal figure when in said chamber.

21. The toy animal apparatus of claim 20 further characterized in that said baby animal figure is provided with a head pivotally secured to the body of said baby animal figure and said head is pivotal to a position in general alignment with the body of said baby animal figure when in said chamber.

22. The toy animal apparatus of claim 19 further characterized in that the body of said mother animal figure is provided with another opening to introduce the baby animal figure into said chamber.

23. The toy animal apparatus of claim 19 further characterized in that a closure member extends over said access opening and is openable to permit said baby animal figure to be removed from said chamber.

24. The toy animal apparatus of claim 23 further characterized in that said closure member is operable by actuation of said manually actuable means.

25. The toy animal apparatus of claim 19 further characterized in that said movable means is also operable with a clutch means such that said manually actuable means can only be operated in one direction to cause operation of said conveyor belt.

26. The toy animal apparatus of claim 24 further characterized in that said access opening is located at the rear portion of the body of said mother animal figure.

27. A toy animal figure apparatus comprising:
 (a) a hollow body having an interior chamber and an opening leading into said chamber,
 (b) a conveyor mechanism in said chamber and including a conveyor surface with a portion located in close proximity to said opening,
 (c) a closure member shiftable over said access opening,
 (d) a mechanism operatively connected to said closure member causing said closure member to move from a closed position over said opening to an open position where said closure member is shifted away from said opening,
 (e) means operatively connecting said conveyor mechanism and the mechanism for operating said closure member so that said conveyor mechanism is actuated and causes operation of said mechanism to shift said closure member to the open position, and
 (f) manually actuable means on said body operatively connected to said conveyor mechanism to actuate same in response to the operation of said mechanically actuable means.

28. The toy animal apparatus of claim 27 further characterized in that said conveyor mechanism comprises a continuous conveyor belt which is inclined away from the horizontal and leading to said opening located at a lower rear portion of said animal body.

29. The toy animal apparatus of claim 27 further characterized in that means is operatively associated with said mechanism to shift said closure member to create a dual time and hold said closure member in the upper position for a period of time even during operation of said manually actuable means.

30. The toy animal apparatus of claim 27 further characterized in that said conveyor mechanism is also operable with a clutch means such that said manually actuable means will only drive said conveyor mechanism in one direction and will only actuate the mechanism connected to said closure member in one direction.

31. The toy animal apparatus of claim 27 further characterized in that said toy animal figure is representative of a mother animal, said apparatus being also comprised of:
 (a) a second toy animal figure representing a baby offspring of said mother animal, said baby animal figure capable of having a size smaller than that of said chamber in the body of the mother animal, said baby animal figure being positionable within said chamber and on said conveyor mechanism so that said baby animal figure will be moved out through the opening representing birth of the baby animal upon actuation of said manually actuable means.

32. The toy animal apparatus of claim 31 further characterized in that said baby animal figure is at least partially collapsible and has a size larger than said chamber in at least one dimension when in the collapsed condition.

33. The toy animal apparatus of claim 32 further characterized in that said baby animal figure is comprised of a plurality of legs pivotally secured to said body of said baby animal and said legs pivotal to be folded adjacent the body of said baby animal figure when in said chamber.

34. The toy animal apparatus of claim 33 further characterized in that said mother animal figure is a horse and said baby animal figure is a foal.

* * * * *